United States Patent [19]
Lind et al.

[11] Patent Number: 5,762,271
[45] Date of Patent: Jun. 9, 1998

[54] WINDSHIELD WASHING SYSTEM FOR MOTOR VEHICLES, PARTICULARLY FOR HEADLIGHTS

[75] Inventors: Thomas Lind, Freudenberg; Peter Orth, Lippstadt; Martin Thorn, Lippetal, all of Germany

[73] Assignee: Hella KG Hueck & Co., Lippstadt, Germany

[21] Appl. No.: 698,151

[22] Filed: Aug. 7, 1996

[30] Foreign Application Priority Data

Aug. 26, 1995 [DE] Germany .............. 195 31 403.4

[51] Int. Cl.⁶ .............. B05B 1/10; B05B 15/06
[52] U.S. Cl. .............. 239/284.2; 239/570
[58] Field of Search .............. 239/284.2, 570; 362/96, 101

[56] References Cited

U.S. PATENT DOCUMENTS

| | | | |
|---|---|---|---|
| 4,955,543 | 9/1990 | Orth et al. | 239/284.2 |
| 5,242,114 | 9/1993 | Camier et al. | 239/284.2 |
| 5,605,286 | 2/1997 | Orth et al. | 239/284.2 |

FOREIGN PATENT DOCUMENTS

| | | | |
|---|---|---|---|
| 508853 | 10/1992 | European Pat. Off. | 239/284.2 |
| 511 104 | 10/1992 | European Pat. Off. | |
| 681 953 | 11/1995 | European Pat. Off. | |
| 38 28 999 | 3/1990 | Germany . | |
| 4121316 | 1/1992 | Germany | 239/284.2 |
| 4130892 | 3/1992 | Germany | 239/284.2 |
| 2 272 363 | 5/1994 | United Kingdom . | |

*Primary Examiner*—Lesley D. Morris
*Attorney, Agent, or Firm*—Griffin, Butler, Whisenhunt & Szipl

[57] ABSTRACT

A windshield washing system for a motor vehicle which moves a jet nozzle (1) from an inward rest position to an outward working position by pressure applied to a cleaning liquid. A valve cover (4) of a valve is moved, together with a nozzle support (2) by the pressure of the cleaning liquid and holds a passageway of the nozzle support closed until the valve cover engages a fixed stop (5) and the valve cover of the valve then opens. The stop is on a fixed shaft-shaped holding element (7) which, in the rest position of the jet nozzle, extends into a receiving element (9). The receiving element is inserted into a passageway of the nozzle support and is sealed, by an inner side of the valve cover. When the jet nozzle is in its working position, cleaning liquid flows through a passage space between the receiving element and the nozzle support to the jet nozzle.

10 Claims, 3 Drawing Sheets

WINDSHIELD WASHING SYSTEM FOR MOTOR VEHICLES, PARTICULARLY FOR HEADLIGHTS

BACKGROUND OF THE INVENTION

This invention concerns a windshield washing system for motor vehicles, particularly for headlights, of a type having a nozzle support for moving a jet nozzle from a rest position to a working position and a valve, including a valve cover, which is moved along with the nozzle support by pressurized cleaning liquid; in which system, before the jet nozzle reaches its working position, the valve cover engages a fixed stop and is thereby separated from a position in which it closes a passageway of the nozzle support.

Such a windshield washing system for a motor vehicle is described in German Offenlegungschrift DE 38 28 999 A1. An adjustable, or moveable, nozzle support has a jet nozzle at one end portion thereof and a roll membrane at another end portion thereof. A surrounding edge portion of the roll membrane is clamped between two housing parts. A passageway leads to the jet nozzle through the nozzle support, through which a cleaning liquid can flow. The jet nozzle is movable outwardly by means of the cleaning liquid from a rest position to a work position. In this regard, the cleaning liquid presses against a side of the roll membrane facing away from the jet nozzle. Immediately before the nozzle support reaches the work position of the jet nozzle, a valve in the passageway opens. The valve has a valve valve cover which is movable by the cleaning liquid along with the nozzle support to a stop. The stop is mounted between the valve and the jet nozzle on an interior surface of a housing part and holds the valve cover back from further outward movement with the nozzle support toward the working position. An outer edge portion of the valve cover engages the stop and cleaning liquid flows through an opening in the valve cover to the passageway of the nozzle support. The cleaning liquid is dispensed from the jet nozzle as a spray cone formed of vapor particles or droplets. Impact of the droplets on a windshield (light transmissive shield) loosens dirt particles on the windshield. This cleaning process is turned off by turning off a pressure creating apparatus for the cleaning liquid. The nozzle support is pressed back inwardly to a rest position by a pressure spring whose force resisted the outward movement. The valve cover is maintained against the stop by bias applied by a pressure spring on its underside while the valve cover is moved, together with the nozzle support, back to the rest position.

It is disadvantageous in this prior art system that an outer edge of the valve cover must be guided by an inner surface of the housing part so that only upon a very small adjustment path of the jet nozzle can it not tilt. Further, the stop between the valve and the jet nozzle could not be mounted on the interior surface of the housing part if the nozzle support, together with a piston, were sealingly within a housing cylinder.

It is an object of this invention to provide a windshield washing system for motor vehicles, particularly for headlights, of the type set forth in the opening paragraph above in which operation of a valve, even for quite large movement paths of the nozzle support, is positively guided and a fixed stop of the valve can be provided even though a guiding system of the movable nozzle support does not allow the fixed stop of the valve to be mounted exteriorly of the nozzle support in an area between the valve and the jet nozzle.

SUMMARY OF THE INVENTION

According to principles of this invention, a stop is mounted at a free end portion of a fixed shaft-shaped holding element and engages behind an edge defining an opening in a valve cover, through which opening the holding element extends (with play). The shaft-shaped holding element, when the jet nozzle is in a rest position, extends in a sealed receiving element which is sealingly mounted on the valve cover. The receiving element is arranged in a passageway of a nozzle support, there being a space between an exterior surface of the receiving element and an interior surface of the nozzle support defining a passage through which the cleaning liquid can flow. Upon activation of a pressure creating apparatus for the cleaning liquid, the cleaning liquid presses the nozzle support, together with the valve cover lying against it, from its rest position. Immediately before the nozzle support reaches its end, working, position, an inner edge defining an opening in the valve cover engages against the stop of the shaft-shaped holding element and the valve cover is thereby separated from the nozzle support. The nozzle support moves further without the valve cover until it reaches its end position. The cleaning fluid can, after the valve cover is separated, flow through the passageway of the nozzle support and is dispensed from the jet nozzle in a spray cone. The spray cone is formed of many water particles whose impact on a windshield loosens dirt particles. The valve cover is radially centered during outward and inward movement of the nozzle support, relative to the movement direction, by means of the fixed shaft-shaped holding element which extends through the passageway of the receiving element. Thus, outer measurements of the valve cover need not be greater than is necessary to sealingly cover the passageway of the nozzle support. Further, a force applied by the stop for separating the small valve cover, from the nozzle support, can be smaller than for a larger valve cover. Further, the windshield washing system need not be structurally larger, because of the shaft-shaped holding element and its receiving element, than it would need be if it had no stop.

The washing system of this invention is also achieved by having a guiding system for the nozzle support which sealingly moves the nozzle support together with a piston in the a housing cylinder. Also in this case, proper operation of the valve is assured even for quite long movement paths.

BRIEF DESCRIPTION OF THE DRAWING

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
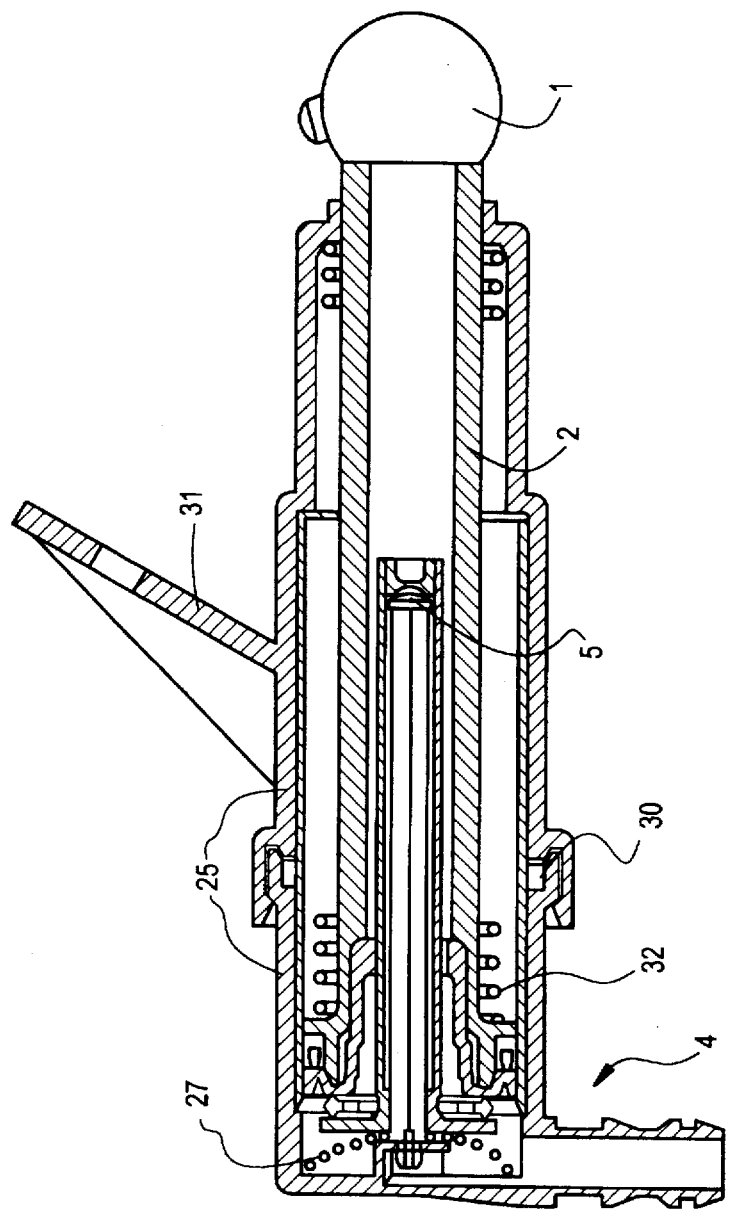
FIG. 1 is a center, lengthwise, cross-sectional view of a movement apparatus of a windshield washing system for motor vehicle headlights of this invention, with a jet nozzle thereof in an inwardly withdrawn, rest, position.
Figure 2:
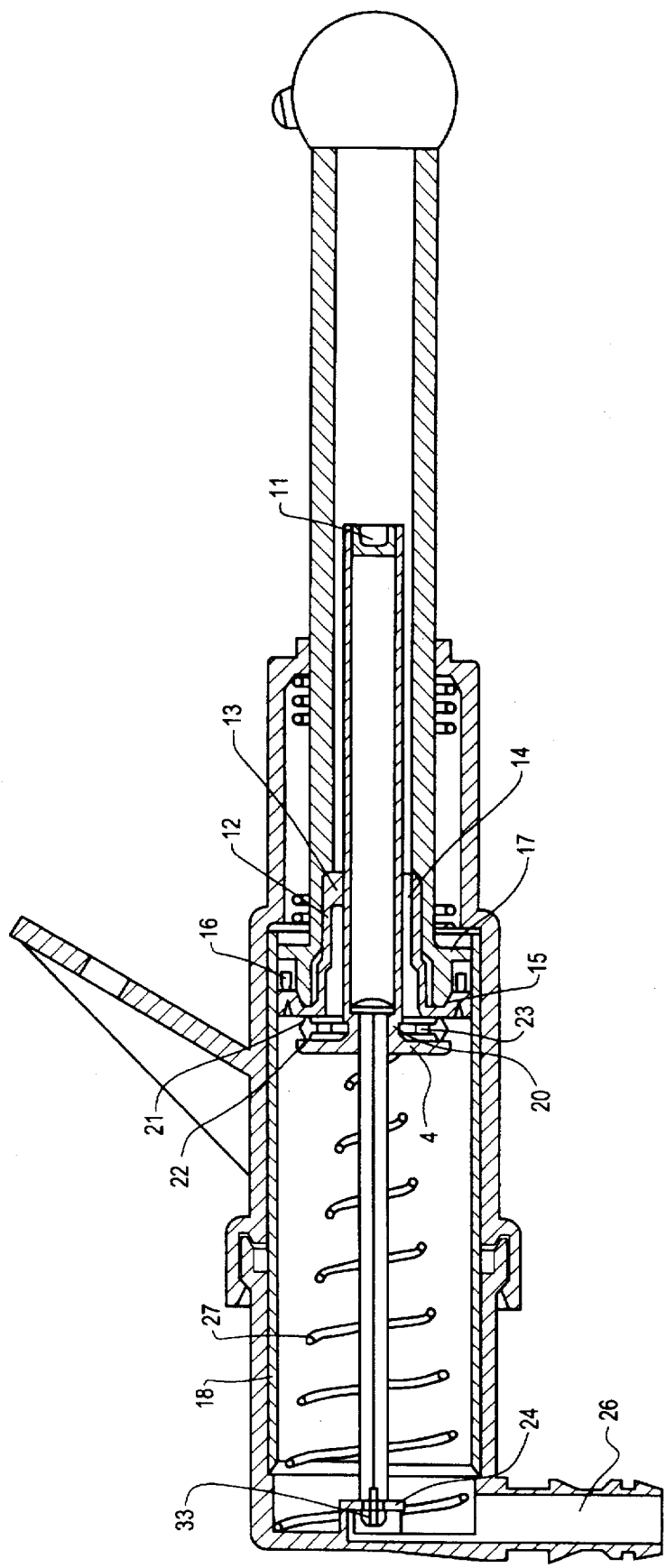
FIG. 2 is a view similar to FIG. 1 with the jet nozzle being outwardly extended, immediately before the jet nozzle reaches its working position, with a valve still being closed.
Figure 3:
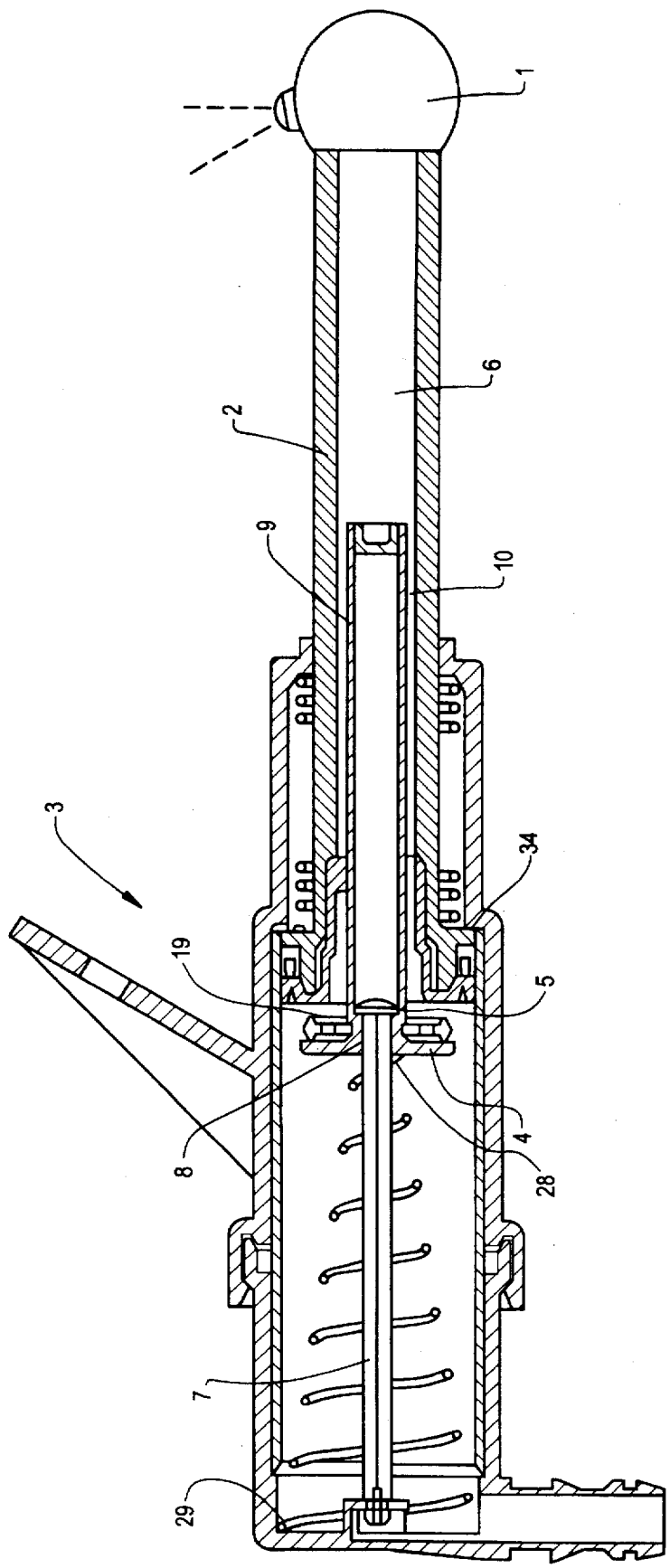
FIG. 3 is a view similar to FIGS. 1 and 2, but with the jet nozzle in an outward working position and the valve being open.

A movement apparatus of a windshield washing system for a motor vehicle headlight has a cylindrically shaped housing 25 of resinous plastic, including a housing top portion and a housing bottom portion. The housing top and bottom portions of the housing 25 are interlocked together with an intermediate seal 30. The housing top portion has an upwardly directed strut 31 with which the movement apparatus is fixedly mounted on a body of the motor vehicle. The seal 30 sealingly lies against a side surface of a metallic cylindrical housing part 18. A piston 17 is in the cylindrical housing part 18, with its piston rings 16 being slideably guided therein. The piston 17 is formed as one piece with a tubularly-shaped nozzle support 2 of resinous plastic. A portion of the nozzle support 2 extending away from the piston 17 extends outwardly from an opening in the housing 25 and has a jet nozzle 1 on an outer end portion thereof extending from the housing 25. The nozzle support 2 is surrounded by a cylindrical coiled spring 32 which is compressed between the piston 17 and the housing 25. The tubularly-shaped nozzle support 2 has a passageway 6 that serves to allow passage for a cleaning liquid. At the piston 17, the passageway 6 flares outwardly in a funnel shape. Into the funnel-shaped portion of the passageway 6 a shell-shaped guiding element 12, of resinous plastic, is shoved to have a press fit therewith. A surrounding flange 15 of the guiding element 12 lies sealingly against the piston ring 16 of the piston 17 and the guiding element 12 has, on an end portion directed toward the jet nozzle 1, three radially inwardly directed guiding protrusions 13, directed toward a tubularly-shaped receiving element 9. A surrounding space, or passage, 10 is left between the tubularly-shaped receiving element 9 and the tubularly-shaped nozzle support 2 for the cleaning liquid and there are respectively intermediate spaces 14 between the guiding protrusions 13. The tubularly-shaped receiving element 9 is sealingly closed at its end directed toward the jet nozzle 1 by a stopper 11 and it is constructed of resinous plastic, as one piece, at its other end, with a valve cover 4 of a valve 3. A sheet-like (wide and substantially flat) seal 19, having a centrally-positioned hole, is shoved onto the tubularly-shaped receiving element 9, with one outer peripheral surrounding seal edge, or ridge, 22 lying sealingly against an interior surface of the valve cover 4 and another outer peripheral surrounding seal edge, or ridge, 21 being sealingly engageable on the flange 15 of the guiding element 12. An edge defining the centrally positioned hole of the sheet-like seal 19 engages in a surrounding groove 20 of the valve cover 4 and the receiving element 9. A plurality of pressure balancing openings 23 are in the sheet-like seal between the seal edges 21 and 22 and the edge of the centrally-positioned hole of the seal 19. The valve cover 4 and the sheet-like seal 19 have substantially the same outer diameter and their outer surrounding edges are spaced inwardly from the cylindrical housing part 18. A centrally-positioned opening 8 is in the valve cover 4 which sealingly leads to a sealed interior of the tubularly-shaped receiving element 9. A shaft-shaped (elongated) holding element 7 is slideable, with much play, in the opening 8 of the valve cover 4. The shaft-shaped holding element 7 has a stop 5 formed as a head at a free end of the shaft-shaped holding element 7 which grips behind an inner opening edge defining the opening 8 into the interior of the tubularly-shaped holding element 9. The shaft-shaped holding element 7 has a, snap, or resilient, engaging nose 33 at its end portion directed away from the jet nozzle 1 which snapingly engages in a recess of the lower part of the housing 25. The recess can be formed by a mold-die, or tool, which is removed through a lateral supply opening 26 for the cleaning liquid in the side of the housing 25. The shaft-shaped holding element 7 is surrounded by a truncated cone-shaped coiled spring 27 which is compressed, between the lower part of the housing 25 and the valve cover 4 and which serves to press the seal 19 of the valve cover 4 against the flange 15. A small-diameter end 28 of the truncated cone-shaped coiled spring 27 lies against the valve cover 4, and its large-diameter end 29 lies against the housing 25. Upon activation of a pressure-creating apparatus (not shown) for the cleaning fluid, the cleaning fluid flows through the supply opening 26 into the interior of the housing 25. The pressure of the cleaning fluid causes the piston 17, together with the valve cover 4, to move in the cylindrical housing part 18. When this is done, the jet nozzle 1 moves outwardly from its rest position, which is shown in FIG. 1, to its working position, which is shown in FIG. 3. At the position of the jet nozzle 1 depicted in FIG. 2, the valve cover 4 engages the stop 5 of the shaft shaped holding element 7, which stop is fixed in the movement direction relative to the housing 25. Because most of the shaft-shaped holding element 7 is now positioned outside of the tubularly-shaped receiving element 9, the interior of the tubularly-shaped receiving element 9 is almost completely filled with cleaning fluid, which reaches the interior space of the tubularly-shaped receiving element 9 because of the large play between the shaft-shaped holding element 7 and the opening 8 of the valve cover 4. After engagement of the valve cover 4 with the stop 5, the valve cover 4 separates, together with its sheet like seal 19, from the flange 15 of the nozzle support 2. Under pressure of the cleaning fluid, the nozzle support 2 moves further until the piston 17 engages a surrounding shoulder 34 of the housing 25. The jet nozzle 1 then finds itself in its working position. In the working position, or operating position, cleaning liquid flows past the valve cover 4 and the seal 19 into the passageway 6 of the nozzle support 2 and is dispensed from the jet nozzle 4 in a spray cone formed of droplets. The impact of the droplets on a windshield of the motor vehicle headlight loosens dirt particles from the windshield which are washed away by the cleaning fluid. Upon the pressure-creating apparatus being turned off, a cylindrical coiled spring 32 presses the nozzle support 2, against a force of the truncated cone-shaped coiled spring 27, to its rest position. The function of the movement device could also be carried out without the truncated cone-shaped coiled spring 27. However, the coiled spring 27 ensures that the valve closes as quickly as possible upon return of the nozzle support 2 and that it also remains closed in a rest position if the valve cover 4, because of contact between the jet nozzle 1 and the vehicle body (not shown), does not fully reach its planned end position. If the valve 3 does not close in the rest position of the jet nozzle 1, all of the cleaning fluid could leak out on the movement device if a container for the cleaning fluid is arranged above the movement device.

The valve cover and the receiving element are structurally uncomplicated and can be cost-effectively produced, by forming the receiving element with a tubular shape, with its end portion, directed toward the jet nozzle, being sealingly closed by a stopper and its other end portion made as one piece with the valve cover surrounding the opening for the shaft-shaped holding element. Further, the valve cover, because of the tubular-shaped receiving element which extends into the passageway, is properly guided when it is separated from the nozzle support.

The receiving element is properly guided, with as little friction as possible, in the passageway of the nozzle support by having the shell-shaped guiding element mounted in the passageway of the nozzle support to form radially inwardly directed guiding protrusions adjacent a cylindrical exterior surface of the receiving element, with the guiding protrusions defining intermediate spaces for passage of the cleaning liquid. Further, along the entire length of the receiving element, there is defined a surrounding uniform space between the receiving element and the nozzle support forming the passageway so as to allow good unobstructed flow for the cleaning liquid.

For a washing system whose nozzle support, together with a piston, is sealingly moveable in a cylindrical housing part, it is further beneficial for the shell-shaped guiding element to have a flange which extends out of the passageway of the nozzle support and which sealingly lies against the valve cover when it is in a position for closing the passageway and which sealingly holds a piston ring of the piston. The guiding element can be easily mounted if it is clamplingly shoved in the passageway until the flange lies against the piston ring.

A seal which is positioned between the valve cover and the nozzle support (and shell-shaped guiding element which is attached to the nozzle support) can be easily and quickly mounted if the seal has a sheet-like shape with a central opening through which the receiving element passes, with the seal being shoved thereon to lie against the valve cover. The seal is, in a movement direction of the nozzle support, securely attached to the valve cover by having an edge thereof which forms the central opening engaged in a surrounding groove of the valve cover. Because of this attachment of the seal in the movement direction the seal cannot remain on the nozzle support when the valve cover separates away therefrom so as to further close the passageway. An additional assurance is created by having one surrounding seal edge lying against the nozzle support and another surrounding seal edge lying against the valve cover, while providing a pressure balancing opening in the seal between these two surrounding seal edges. This prevents the seal, when the valve cover separates, from sucking against the nozzle support.

Further, it is beneficial that an end of the shaft-shaped holding element directed toward the jet nozzle has a head thereon which provides a fixed stop for the valve cover and extends into the receiving element with play. In this manner, the valve cover is additionally held by the head of the shaft-shaped holding element exactly radial to the movement direction.

The mounting of the shaft-shaped holding element can be easily and quickly accomplished if its end portion, directed away from the jet nozzle, can be snappingly engaged in a recess in the housing of the nozzle support. The recess is producable in an uncomplicated manner by an adjustable molding-die tool which can be removed through the supply opening of the housing.

In a further embodiment of the invention a compression spring engages a side of the valve cover directed away from the jet nozzle, which spring, in a relaxed condition is a cone-shaped coiled spring whose small diameter end surrounds the shaft-shaped holding element, with play, and lies against the side of the valve cover facing away from the jet nozzle, under compression, while the large-diameter end of the coiled spring applies pressure against the housing of the nozzle support. In this manner, an additional attaching element to securely hold the coiled spring in all positions of the nozzle support is not necessary. The coiled spring assures that the valve cover, during outward and inward movements, as well as in the rest position of the nozzle support and at the stop, lies sealingly against the nozzle support.

While the invention has been particularly shown and described with reference to a preferred embodiment, it will be understood by those of ordinary skill in the art that various changes in form and detail may be made therein without departing from the spirit and scope of the invention.

The invention claimed is:

1. Windshield washing system for motor vehicles, particularly for headlights, comprising:
    a jet nozzle assembly including a nozzle support for moving a jet nozzle from a rest position to a working position and a valve comprising a valve cover which is moved, along with the nozzle support, by pressurized cleaning liquid, but which, immediately before the jet nozzle reaches a working position, engages a fixed stop and is thereby separated from a position on the nozzle support in which it closes a passageway of the nozzle support;
    wherein, the fixed stop is mounted at a free end portion of a fixed shaft-shaped holding element and engages an edge defining an opening in the valve cover through which the holding element extends with play; and
    wherein, is further included a receiving element which is sealingly mounted on the valve cover, the receiving element being arranged in the passageway of the nozzle support, there being a space between the receiving element and an interior surface defining the passageway of the nozzle support, so as to leave the space between the receiving element and the interior surface defining the passageway through which the cleaning liquid can flow; and
    wherein, the shaft-shaped holding element, when the jet nozzle is in the rest position, extends into the receiving element through an opening therein.

2. Windshield washing system as in claim 1 wherein the receiving element: has a tubular-shape; has its end portion which is directed toward the jet nozzle sealingly closed by a stopper; and has its end portion constructed as one piece with the valve cover, which cover surrounds the opening of the shaft-shaped holding element.

3. Windshield washing system as in claim 1 wherein the nozzle support has mounted thereon an annular-shaped guiding element which is a separate piece placed in the passageway of the nozzle support, the guiding element having radially inwardly directed guiding protrusions which border a cylindrically shaped side surface of the receiving element, with the guiding protrusions defining a plurality of intermediate spaces between them for allowing flow of cleaning liquid therebetween.

4. Windshield washing system as in claim 3 wherein is further included a resilient piston ring and wherein the annular-shaped guiding element has a outer surrounding flange which extends out of the passageway of the nozzle support, against which the valve cover, in its closing position, sealingly lies and which sealingly lies against the piston ring so that the nozzle support, together with the shell-shaped guiding element and the piston ring, forms a piston which is moveably guided in a cylindrical housing part.

5. Windshield washing system as in claim 1 wherein the valve cover has a sheet-like seal for sealing with the nozzle support, the sheet-like seal having a centrally positioned opening for receiving the receiving element, with the seal being shoved thereon until it engages the valve cover.

6. Windshield washing system as in claim 5 wherein an edge defining the centrally positioned opening in the sheet-like seal engages in a surrounding groove of the valve cover and this is fixed therein, relative to the valve cover, in a movement direction of the valve cover.

7. Windshield washing system as in claim 5 wherein a first peripheral surrounding seal edge of the sheet-like seal seals with the nozzle support and a second peripheral surrounding seal edge of the sheet-like seal seals with the cover and wherein the sheet-like seal has at least one pressure balancing opening therethrough extending between the first and second seal edges.

8. Windshield washing system as in claim 1 wherein an end of the shaft-shaped holding element directed toward the jet nozzle has a head thereon which is for engaging the valve cover to thereby serve as a fixed stop for the valve cover, said head being positioned inside said receiving element.

9. Windshield washing system as in claim 1 wherein an end portion of the shaft-shaped holding element directed away from the jet nozzle has a snap attachment thereon for self-guiding snapping engagement with a recess in a housing of the nozzle support, said recess being positioned near a supply opening of the housing so that it can be formed by a molding tool which is removed through the supply opening.

10. Windshield washing system as in claim 1 wherein a coiled compression spring applies pressure against a side of the valve cover facing away from the jet nozzle, which spring, in a relaxed condition, has a truncated-cone-shape with its small diameter end surrounding the holding element, with play, and pressing against the side of the valve cover facing away from the jet nozzle, while its large diameter end is pressed against the housing of the nozzle support.

* * * * *